Aug. 9, 1938. G. A. E. KAUL 2,126,558
PHOTOGRAPH FRAME
Filed Jan. 4, 1937
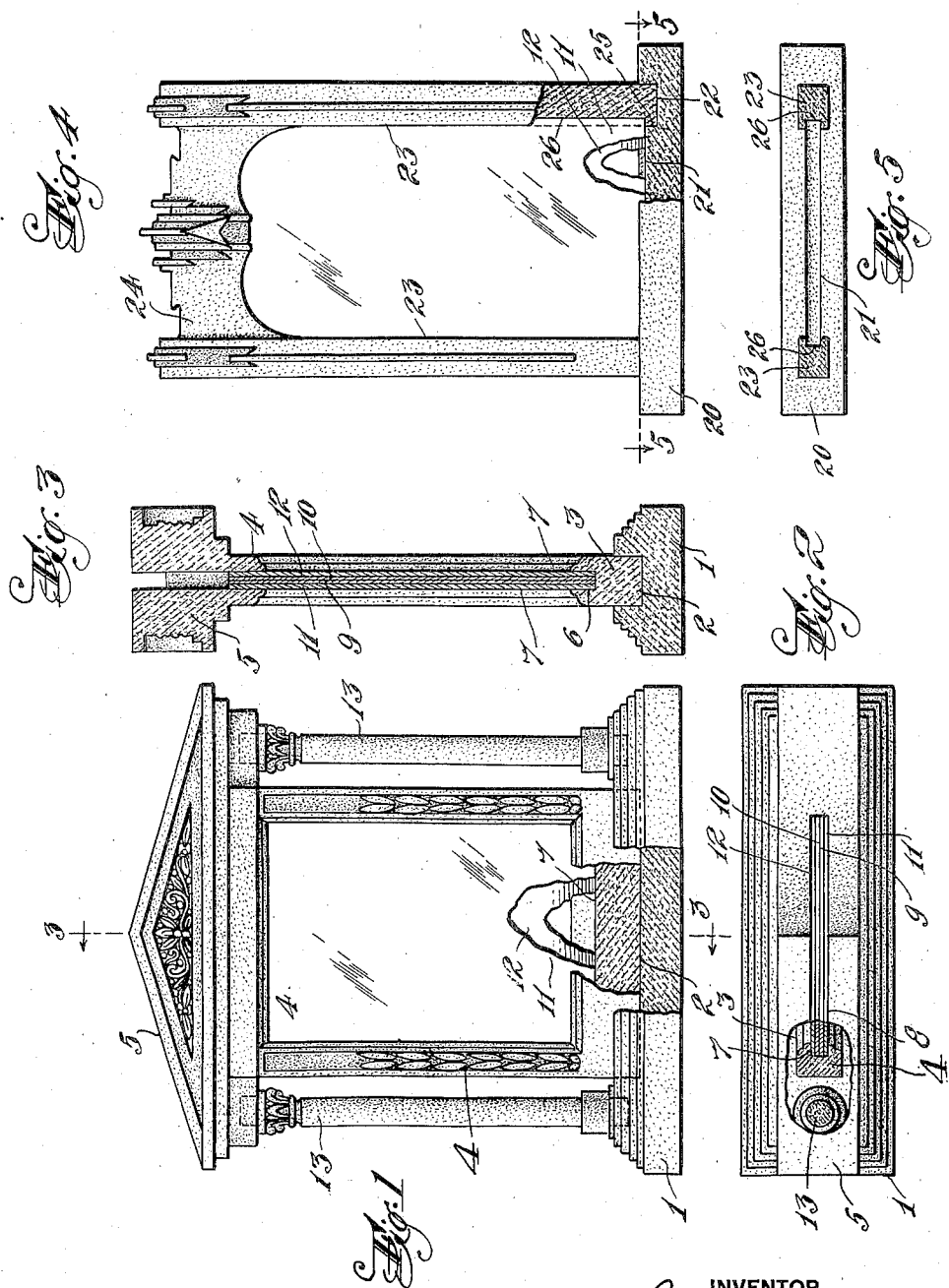
INVENTOR
Gustav A. E. Kaul
BY Fredk C. Fischer
ATTORNEY Patented Aug. 9, 1938

2,126,558

UNITED STATES PATENT OFFICE 2,126,558

PHOTOGRAPH FRAME

Gustav A. E. Kaul, Hackensack, N. J.

Application January 4, 1937, Serial No. 118,977

1 Claim. (Cl. 40—152.1)

This invention relates to frames for photographs, and more particularly to an ornamental frame adapted for displaying photographs on both sides of the frame.

The usual frame for photographs and pictures comprises a front face and back, the front face displaying the picture, while the back is merely a covering for properly supporting the picture in the frame. This type of frame is objectionable in that not only is one face of the frame not used, but in order to remove the picture, it is necessary to remove the back, which is, often, a rather inconvenient procedure.

It is an object of this invention to provide a frame for photographs, pictures and the like, which has two faces, front and back, said faces being bordered by ornamentation, and supported by a base. The frame is adapted for displaying simultaneously pictures on both the front and back faces.

A further object is the provision of a frame for displaying pictures and photographs on both the front and back face simultaneously, which frame is of extremely simple structure and capable of bearing suitable ornamentations.

These and other advantageous objects, which will later appear, are accomplished by the simple and practical construction and arrangement of parts hereinafter described and exhibited in the accompanying drawing, forming part hereof, and in which:

Fig. 1 is a front elevational view of a frame embodying my invention,

Fig. 2 is a top plan view of the frame,

Fig. 3 is a sectional view taken on line 3—3 of Fig. 1,

Fig. 4 is a front elevational view of a modified form of the invention, and

Fig. 5 is a sectional view taken on the line 5—5 of Fig. 4.

Referring to the drawing, in Fig. 1 the frame is shown to comprise a base 1 having a central groove 2 extending longitudinally thereof, in which is tightly fitted the bottom cross member 3 of a frame having upright side portions 4 and a top cross member 5. The bottom cross member 3 is provided with a groove 6, and the upright side portions 4 are provided with the corresponding grooves 7. The top cross-member 5 is provided with a slot 8 through which pictures, photographs, 9 and 10, together with the sheets 11, 12 of covering glass can be conveniently slid into the grooves 7 and 6 and be supported by the frame so that the pictures or photographs 9 and 10 can be viewed from either the front or the rear of the frame.

The top cross member and the base 1 may be made of various shapes for ornamental purposes; and likewise the upright side portions 4 of the frame may be ornamented in various manners as shown for example in Fig. 1. If desired further ornamentations may be provided and at the same time provide a further support for the frame by mounting ornamental columns 13 on the base and connecting said columns with the top cross member.

In Fig. 4 is shown a modified form of the invention in which a base 20 is provided with a groove 21 extending longitudinally thereof and having recess portions 22 adjacent the ends thereof. A frame having side members 23 and a top cross member 24 is supported on said base by means of feet 25 at the lower ends of the side members 23 fitting tightly into the recesses 22 as shown in Fig. 4. The side members 23 are provided with grooves 26 which communicate with the groove 21, and the cross member 24 has a slot similar to the slot shown at 8 in Fig. 2, through which photographs, pictures and the like can be inserted into the grooves 26 and 21.

From the above description it will be seen that there has been provided a frame for photographs having a simple structure which enables the exhibiting of photographs, pictures and the like, simultaneously on the front and back faces of the frame.

The foregoing disclosure is to be regarded as descriptive and illustrative only, and not as restrictive or limitative of the invention, of which obvious embodiments may be constructed, including many modifications, without departing from the general scope herein indicated and denoted in the appended claim.

Having thus described my invention, what I claim as new and desire to secure by Letters Patent, is:

In a device for exhibiting pictures and the like, a base having a central groove extending longitudinally thereof, and provided with recesses at the ends of said groove, and a frame having side members provided with feet at the bottom thereof fitted tightly into said recesses, said side members having grooves registering with the groove in the base, said frame having a top cross member having a slot through which pictures or the like can be inserted back to back into said grooves so that said pictures can be exhibited from both sides of the frame.

GUSTAV A. E. KAUL.